United States Patent
Marmignon

(10) Patent No.: US 10,228,980 B2
(45) Date of Patent: Mar. 12, 2019

(54) SYSTEM AND METHOD FOR PROVIDING SEAMLESS THIN CLIENT CONVERSION

(71) Applicant: Citrix Systems, Inc., Fort Lauderdale, FL (US)

(72) Inventor: Pierre Marmignon, Bry (FR)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 79 days.

(21) Appl. No.: 15/416,080

(22) Filed: Jan. 26, 2017

(65) Prior Publication Data

US 2017/0212765 A1    Jul. 27, 2017

Related U.S. Application Data

(60) Provisional application No. 62/287,641, filed on Jan. 27, 2016.

(51) Int. Cl.
| | | |
|---|---|---|
| *G06F 9/00* | (2006.01) | |
| *G06F 9/24* | (2006.01) | |
| *G06F 9/50* | (2006.01) | |
| *G06F 21/62* | (2013.01) | |
| *G06F 9/455* | (2018.01) | |
| *G06F 9/451* | (2018.01) | |

(52) U.S. Cl.
CPC ............ *G06F 9/5077* (2013.01); *G06F 9/451* (2018.02); *G06F 9/45512* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 2011/0055535 A1* | 3/2011 | Verdy | G06F 8/61 713/2 |
| 2014/0354531 A1* | 12/2014 | Foreman | G06F 3/0481 345/156 |
| 2015/0188992 A1* | 7/2015 | Ayanam | H04L 67/42 709/203 |

* cited by examiner

*Primary Examiner* — Nitin C Patel
(74) *Attorney, Agent, or Firm* — Allen, Dyer, Doppelt + Gilchrist, PA

(57) ABSTRACT

A computer processing system includes a processor to operate based on an operating system providing an operating system user interface, and to detect when a user session is opened. A memory is coupled to the processor and is configured to store the operating system. A thin client conversion engine is configured to perform, in response to the opened user session and before the user can interact with the operating system setting at least one hook to manage control of user interactions with the operating system, and intercepting at least one shell component of the operating system so that the at least one shell component is not available to the user. State information on the at least one shell component at the time of intercept is saved in the memory. The thin client conversion engine redefines the operating system user interface based on the setting and intercepting without making any changes to the operating system.

27 Claims, 3 Drawing Sheets

SYSTEM AND METHOD FOR PROVIDING SEAMLESS THIN CLIENT CONVERSION

RELATED APPLICATIONS

This application claims the benefit of provisional application Ser. No. 62/287,641 filed Jan. 27, 2016, which is hereby incorporated herein in its entirety by reference.

TECHNICAL FIELD

The present disclosure relates to the field of computer processing systems, and more particularly, to providing a thin client conversion within a computer processing system.

BACKGROUND

When an enterprise is deciding to use virtual desktop solutions, server based computing, and/or web applications, the computer may be replaced by a thin client computer or the operating system of the computer may be replaced with a thin client computing environment. A thin client computer and/or computing environment is one that relies on the resources of another computer and/or computing environment.

Some techniques that convert workstations to thin clients include, for example, by replacing a Microsoft™ Windows™ operating system shell (e.g., replacing the explorer.exe shell that manages the graphical interface to the OS including a start menu, taskbar, desktop, and file manager), replacing the underlying operating system completely with a different operating system (e.g., a lightweight Linux™ based operating system), and/or replacing a computer system with new thin client hardware. However, when the replacement either replaces the entire operating system to a new operating system, or alters the way in which the existing entire operating works with a new shell, several problems occur.

When the underlying operating system is changed, for example, from a Microsoft™ Windows™ operating system to a new operating system that provides virtualized clients access to a virtualization computing infrastructure, the downsides include a high initial cost because every workstation in the enterprise will have to be converted, a new management system will be required, rollout time is increased due to the scheduling of the conversion of all the workstations, and roll back to the prior operating system in the event of any issues can be extremely costly.

When the shell of the existing operation system is changed, using a shell replacement method, there are also several downsides that include a lack of reliability between the new shell and the existing operating system, difficulty to manage user/OS interactions due to removal of the old shell (e.g., support teams will have to get used to new habits to be able to help users), certain applications that relied on the operating system's original shell will not be compatible with the new shell, and roll back in case of any issues will again be extremely costly.

SUMMARY

A computer processing system includes at least one processor configured to operate based on an operating system providing an operating system user interface, and to detect when a user session is opened. At least one memory may be coupled to the at least one processor and configured to store the operating system. A thin client conversion engine may be configured to perform, in response to the opened user session and before the user can interact with the operating system, setting at least one hook to manage control of user interactions with the operating system, and intercepting at least one shell component of the operating system so that the at least one shell component is not available to the user. The state information on the at least one shell component at the time of intercept may be saved in the at least one memory. The thin client conversion engine may then redefine the operating system user interface based on the setting and intercepting without making any changes to the operating system.

The redefined operating system user interface may initiate connection with a virtualized computing environment. Alternatively, the redefined operating system user interface may initiate connection with a restricted user interface to allow access to virtualized and non-virtualized resources.

The redefined operating system user interfacer may be further configured to process an unlock request provided by the user, disable the thin client conversion engine in response to the unlock request, return control of user interactions with the operating system to the user, and make available to the user the at least one intercepted shell component based on the saved state information.

The redefined operating system user interface may be further configured to process a lock request provided by the user, and re-enable the thin client conversion engine in response to the lock request. Re-enabling the thin client conversion engine may cause the thin client conversion engine to repeat setting the at least one hook to manage control of user interactions with the operating system, repeat intercepting the at least one shell component of the operating system so that the at least one shell component is not available to the user, repeat saving the state information on the at least one shell component at the time of repeating the intercept, and repeat redefining the operating system user interface based on the setting and intercepting without making any changes to the operating system.

The user session may be opened when the user logs into the computer processing system. The operating system may comprise a Windows™ based operating system, for example.

The computer processing system may further comprise at least one input device coupled to the at least one processor, and the at least one hook may be configured to take control of the at least one input device so as to prevent any non-allowed user interactions.

The operating system may have at least one application program interface (API) associated therewith, and the intercepting may comprise using the at least one API to hide or disable the at least one shell component of the operating system. The at least one shell component may comprise at least one of a start menu, a taskbar, and a start button.

The thin client conversion engine may be further configured to monitor activity of the at least one processor so as to detect an idle state of the computer processing system over a set period of time, and turn off the computer processing system based on the detected idle state.

Another aspect is directed to a method for providing thin client conversion of a computer processing system. The method may comprise detecting when a user session is opened on the computer processing system, with the computer processing system comprising an operating system providing an operating system user interface. A thin client conversion engine may be launched in response to the opened user session and before the user can interact with the operating system. The thin client conversion engine may be configured to set at least one hook to manage control of user interactions with the operating system, intercept at least one shell component of the operating system so that the at least one shell component is not available to the user, save state information on the at least one shell component at the time of intercept, and redefine the operating system user interface based on the setting and intercepting without making any changes to the operating system.

The redefined operating system user interface may initiate connection with a virtualized computing environment. Alternatively, the redefined operating system user interface may initiate connection with a restricted user interface to allow access to virtualized and non-virtualized resources.

The method may further comprise using the redefined operating system user interface to process an unlock request provided by the user, disable the thin client conversion engine in response to the unlock request, return control of user interactions with the operating system to the user, and make available to the user the at least one intercepted shell component based on the saved state information.

The method may further comprise using the redefined operating system user interface to process a lock request provided by the user, and re-enable the thin client conversion engine in response to the lock request. Re-enabling the thin client conversion engine may comprise repeat setting the at least one hook to manage control of user interactions with the operating system, repeat intercepting the at least one shell component of the operating system so that the at least one shell component is not available to the user, repeat saving the state information on the at least one shell component at the time of repeating the intercept, and repeat redefining the operating system user interface based on the setting and intercepting without making any changes to the operating system.

Yet another aspect is directed to a non-transitory computer readable medium having a plurality of computer executable instructions for causing a computer processing system to perform steps comprising detecting when a user session is opened on the computer processing system. The computer processing system may comprise an operating system providing an operating system user interface. A thin client conversion engine may be launched in response to the opened user session and before the user can interact with the operating system. The thin client conversion engine may be configured to set at least one hook to manage control of user interactions with the operating system, intercepting at least one shell component of the operating system so that the at least one shell component is not available to the user, saving state information on the at least one shell component at the time of intercept, and redefining the operating system user interface based on the setting and intercepting without making any changes to the operating system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
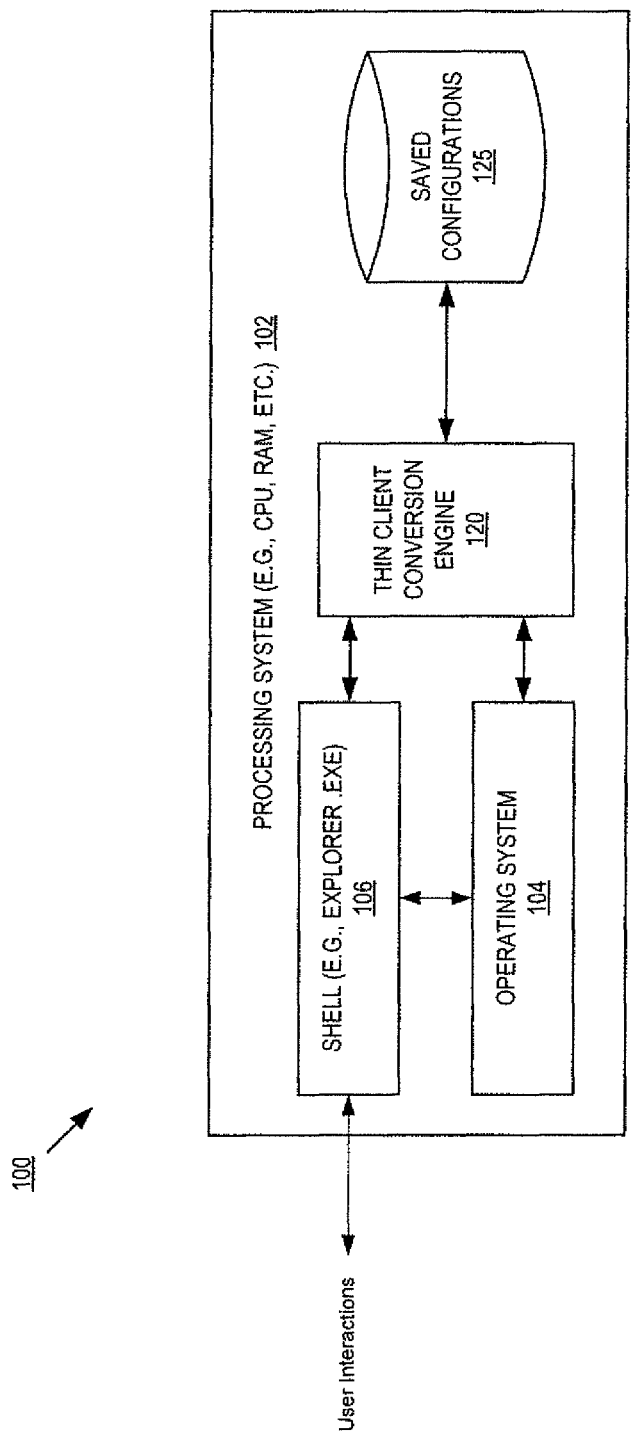
FIG. 1 illustrates on embodiment of a computing processing system with thin client conversion.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

A method and process for providing thin client conversion of an existing operating system providing an operating system user interface is described. In one embodiment, the thin client conversion is provided without replacing the operating system and without replacing the operating system shell. In one embodiment, a software agent, referred to herein as a thin client conversion engine, is initiated to perform one or more conversion operations. In embodiments, the software agent performs the conversion operations after a user logs into a computer system's operating system, and before the user can interact with the operating system.

In one embodiment, the software agent sets hooks and hides/disables certain components of the operating system to prevent the user from accessing and/or interacting with the underlying operating system. Then, the software agent, based on its configuration and settings, starts up an individual application, a virtualized desktop, or a customizable kiosk interface that could include a hardened web browser. Thus, the software agent redefines the operating system user interface so as to provide the virtualized computing environment that the user will interact with on the computer system, using the underlying/existing operating system and computing system resources. However, the hooks, as well as the disabled and/or hidden operating system components, ensure that user access to the underlying operating system is prevented. Beneficially, in the embodiments discussed herein, the existing computer system and client operating system can be utilized for providing a virtualized computing environment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as generating, converting, executing, storing, receiving, obtaining, constructing, accessing, capturing, or the like, refer to the actions and processes of a computer system, or similar electronic computing device. The actions and processes may include manipulating and transforming data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates on embodiment of a computing processing system 100 with thin client conversion. In one embodiment, the processing system includes computing resources, such as one or more processors, memory, user input output devices, etc. An operating system 104 is run by the resources of the processing system, and includes a shell 106 that manages the graphical interface to operating system 104 including management of a start menu, taskbar, desktop, and file manager. In one embodiment, the operating system 104 is a Microsoft™ Windows™ operating system having an explorer.exe shell.

In one embodiment, thin client conversion engine 120 monitors shell 106 and operating system 104 to determine when a user is logging into operating system 104. In one embodiment, in response to user login, thin client conversion engine 120 utilizes one or more application programming interface (APIs) tools of the operating system 104 to control user interactions with shell 106. The control can include hiding and/or disabling certain components of the shell, such as preventing and/or hiding access to certain components such as a start button, application toolbar, or even a desktop application of operating system 104. In one embodiment, the state of these applications and/or controls is stored in saved configurations data store 125.

In one embodiment, the thin client conversion engine 120 may then provide a redefined operating system user interface so as to provide a virtualized computing environment, by executing a virtualized application, a virtualized desktop computing environment, or a configurable virtualized web browser providing access to multiple applications, over the shell 106.

In one embodiment, thin client conversion engine 120 may optionally disable the hooks, enable previously disabled shell 106 components, and display previously hidden shell 106 components to provide access to the shell 106 and/or operating system 104. In one embodiment, the access may be provided to support teams to trouble shoot issues with the thin client conversion engine 120, trouble shoot hardware and/or operating system 104 issues, to rollback a virtualized environment, etc. Once the troubleshooting is complete, the hooks may be reinstantiated, and the components disabled/hidden.

In one embodiment, thin client conversion engine 120 may also monitor one or more processing resources of processing system 102. The resources are monitored so that thin client conversion engine 120 may turn off a computer processing system during certain hours (e.g., non-business hours), in response to detecting an idle state over a threshold amount of time (e.g., no use of a system for 10 minutes), as well as to take other resource preservation actions. Thus, in embodiments, the thin client conversion engine 120 further monitors and helps to preserve power, network bandwidth, as well as other computing resources.

In embodiments, the thin client conversion engine 120 enables the provisioning of a virtualized computing environment on an existing computer processing system of an enterprise without requiring a change to the underlying operating system (e.g., replacing the OS's shell) and without replacing the operating system altogether. Beneficially, the existing operating systems running on computers of an enterprise may be kept in place, and those computer systems provided with different virtualized environments. Furthermore, access to the underlying operating system and shell are preserved by avoiding changing or replacing those components. Thus, for example, the described embodiments use several techniques to allow on the fly conversion of a Microsoft™ Windows™ computer system into a thin client like device, without having to replace the existing Microsoft™ Windows™ operating system or without replacing the Microsoft™ explorer.exe shell. Furthermore, this conversion is non-intrusive and can be reversed on the fly without any specific issues.

Figure 2:
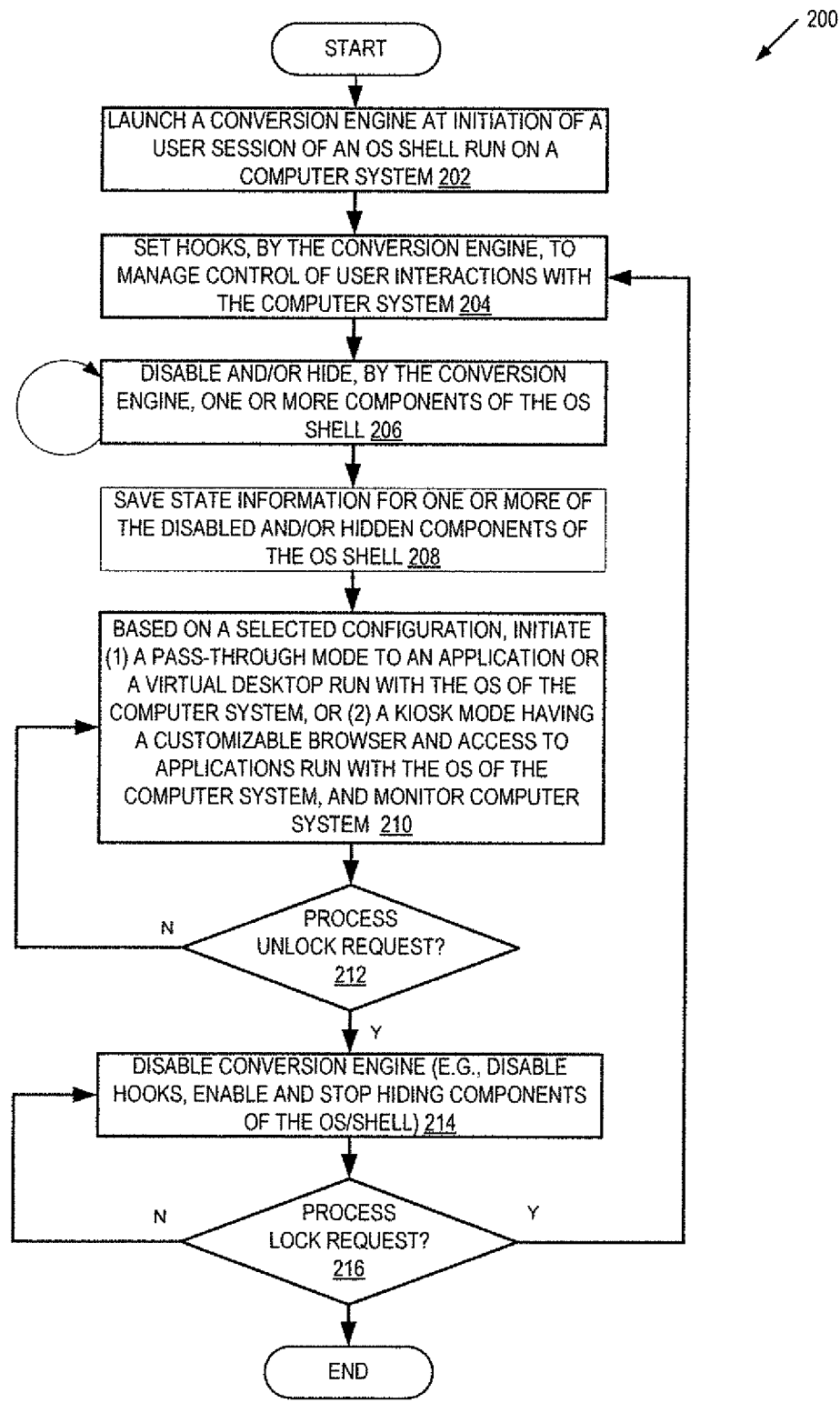
FIG. 2 is a flow chart illustrating one embodiment of a process for providing thin client conversion.

FIG. 2 is a flow chart illustrating one embodiment 200 of a process for providing thin client conversion. The process is performed by processing logic that may comprise hardware (circuitry, dedicated logic, etc.), software (such as is run on a general purpose computer system or a dedicated machine), firmware, or a combination. In one embodiment, the process is performed by thin client conversion engine 120.

Referring to FIG. 2, the process begins by launching a conversion engine at initiation of a user session of an OS shell run on a computer system (processing block 202). That is, when a user session is opened on a Microsoft™ Windows™ computer, the shell (e.g., explorer.exe) is launched as part of the logon process. As discussed herein, the shell manages the user interface (e.g., the desktop) and components of the user interface, such as the start button, taskbar, etc. In one embodiment, the conversion engine is launched before a user can interact with the desktop.

Processing logic sets hooks, by the conversion engine, to manage control of user interactions with the computer system (processing block 204). In one embodiment, as soon as launched, the conversion engine will set keyboard and mouse hooks to take control of the mouse and keyboard and prevent any non-allowed user interactions.

Processing logic then disables and/or hides, by the conversion engine, one or more shell components of the OS shell (processing block 206). In one embodiment, the conversion engine will disable and hide the components using available operating system APIs. In one embodiment, Microsoft™ Windows™ APIs are used to hide and/or disable one or more of a start menu, a taskbar, a start button, edge user interface elements (on Microsoft™ Windows™ 8.0 or later Oss).

Processing logic saves state information for one or more of the disabled and/or hidden components of the OS shell (processing block 208). In one embodiment, to allow a real "full screen" experience, processing logic minimizes the taskbar its previous state will be saved. Furthermore, to prevent any controls to appear, controls visibility will be periodically checked by processing logic at a pre-configured time interval (e.g., every second, every minute, every hour, etc.) and processed again if necessary. For example, using Microsoft™ group policy settings, the conversion engine will lock down the underlying operating system preventing any non-desired user interactions with the operating system and/or shell components.

Processing logic will initiate via a redefined operating system user interface, and based on a selected configuration, (1) a pass-through mode to an application or a virtual desktop run with the OS of the computer system, or (2) a kiosk mode having a customizable browser and access to applications run with the OS of the computer system, and monitor the computer system (processing block 210). In one embodiment, the conversion engine may be configured in different ways:

Pass-through mode: user will be directly connected to a configured application or a virtual desktop. The conversion engine will monitor the application status (e.g., virtualized application and/or desktop), and when the application is exited, the conversion engine can restart the application, logoff the user, or shutdown/restart the computer; and Kiosk mode: users will be presented with a customizable interface integrating a browser and allowing easy access to one or more local and/or virtual applications.

In one embodiment, the conversion engine may also integrate power savings features allowing target computers to be shut down after user is idle or at a specific time of the day to save energy.

Processing logic receives an unlock request and determines when a support password is received (processing block 212). In one embodiment, the unlock request is received in response to processing logic detecting a specific combination of keystrokes. For example, the combination of keystrokes could be ctrl+alt+u. Then a password prompt receives entry of a support password. However, when no valid support password is received, the process returns to processing block 210 to continue the conversion engine providing the configured virtualized computing environment. However, when the valid support password is received, processing logic disables the conversion engine (e.g., unlocks the conversion engine and stops all processes that prevent the shell to display/processing of user requests) (processing block 214). In one embodiment, to ease support, in either of the two modes, a combination of keys can be entered as a password. When the password is entered, the conversion engine will be disabled, thereby allowing support teams to perform one or more troubleshooting tasks.

When processing logic detects a lock request (processing block 216), processing logic returns to processing block 204 to re-enable the hooks, disable and/or hide the OS/shell components, save the state information, and start the selected virtualized configuration, as discussed above. In one embodiment, the lock request may be triggered in response to receiving another sequence of keystrokes (e.g., ctrl+alt+l). The locking may further includes a request for a support password, which can be the same support password or a different support password as that discussed above. Alternatively, the lock request may simply be subject to verification before being completed. The conversion engine can then be enabled again, thereby locking the desktop. Furthermore, the disabling of the conversion engine, performance of support services, and restarting of the conversion engine may all be accomplished without having to log the user off and back on again.

Figure 3:
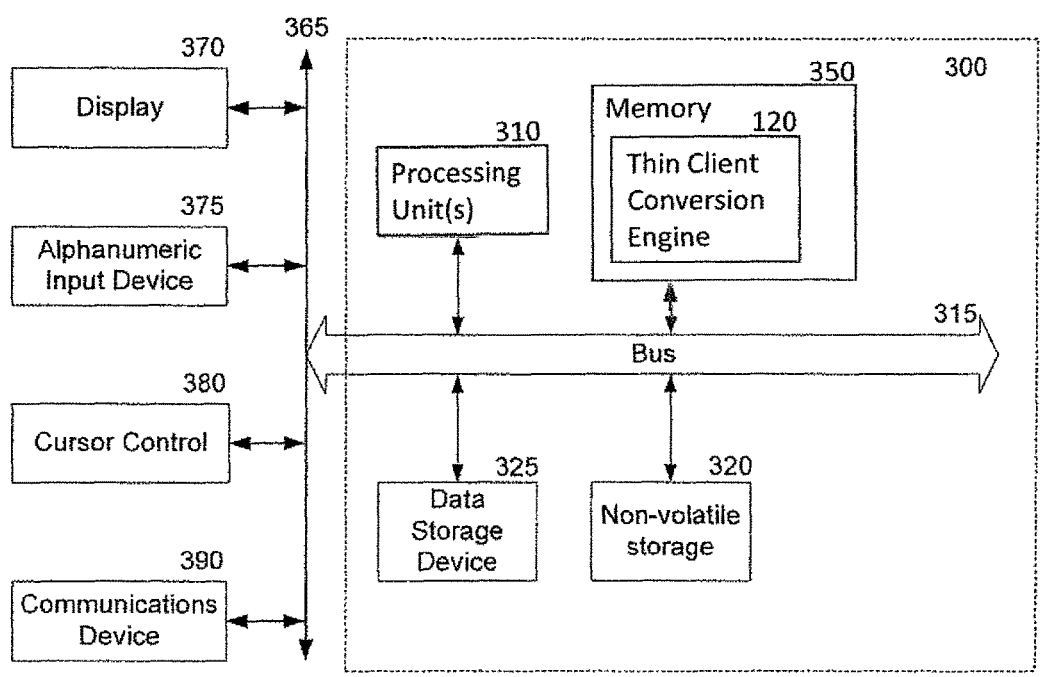
FIG. 3 is one embodiment of a computer system that may be used with the present invention.

FIG. 3 is one embodiment of a computer system that may be used with the present invention. It will be apparent to those of ordinary skill in the art, however that other alternative systems of various system architectures may also be used.

The data processing system illustrated in FIG. 3 includes a bus or other internal communication means 315 for communicating information, and a processor 310 coupled to the bus 315 for processing information. The system further comprises a random access memory (RAM) or other volatile storage device 350 (referred to as memory), coupled to bus 315 for storing information and instructions to be executed by processor 310. Main memory 350 also may be used for storing temporary variables or other intermediate information during execution of instructions by processor 310. The system also comprises a read only memory (ROM) and/or static storage device 320 coupled to bus 315 for storing static information and instructions for processor 310, and a data storage device 325 such as a magnetic disk or optical disk and its corresponding disk drive. Data storage device 325 is coupled to bus 315 for storing information and instructions.

The system may further be coupled to a display device 370, such as a liquid crystal display (LCD), coupled to bus 315 through bus 365 for displaying information to a computer user. An alphanumeric input device 375, including alphanumeric and other keys, may also be coupled to bus 315 through bus 365 for communicating information and command selections to processor 310. An additional user input device is cursor control device 380, such as a touchpad, mouse, a trackball, stylus, or cursor direction keys coupled to bus 315 through bus 365 for communicating direction information and command selections to processor 310, and for controlling cursor movement on display device 370.

Another device, which may optionally be coupled to computer system 300, is a communication device 390 for accessing other nodes of a distributed system via a network. The communication device 390 may include any of a number of commercially available networking peripheral devices such as those used for coupling to an Ethernet, token ring, Internet, or wide area network. The communication device 390 may further be a null-modem connection, or any other mechanism that provides connectivity between the computer system 300 and the outside world. Note that any or all of the components of this system illustrated in FIG. 3 and associated hardware may be used in various embodiments of the present invention.

It will be appreciated by those of ordinary skill in the art that any configuration of the system may be used for various purposes according to the particular implementation. The control logic or software implementing the present invention can be stored in main memory 350, mass storage device 325, or other storage medium locally or remotely accessible to processor 310.

It will be apparent to those of ordinary skill in the art that the system, method, and process described herein can be implemented as software stored in main memory 350 or read only memory 320 and executed by processor 310. This control logic or software may also be resident on an article of manufacture comprising a computer readable medium having computer readable program code embodied therein and being readable by the mass storage device 325 and for causing the processor 310 to operate in accordance with the methods and teachings herein.

The present invention may also be embodied in a handheld or portable device containing a subset of the computer hardware components described above. For example, the handheld device may be configured to contain only the bus 315, the processor 310, and memory 350 and/or 325. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 310, a data storage device 325, a bus 315, and memory 350, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer processing system comprising:
    at least one processor configured to operate based on an operating system providing an operating system user interface, and to detect when a user session is opened;
    at least one memory coupled to said at least one processor and configured to store the operating system; and
    a thin client conversion engine configured to perform, in response to the opened user session and before the user can interact with the operating system, the following
        setting at least one hook to manage control of user interactions with the operating system,
        intercepting at least one shell component of the operating system so that the at least one shell component is not available to the user,
        saving state information in said at least one memory on the at least one shell component at the time of intercept, and
        redefining the operating system user interface based on the setting and intercepting without making any changes to the operating system so that the user is not able to access the at least one shell component in order to provide a seamless thin client conversion.

2. The computer processing system according to claim 1 wherein the redefined operating system user interface initiates connection with a virtualized computing environment.

3. The computer processing system according to claim 1 wherein the redefined operating system user interface initiates connection with a restricted user interface to allow access to virtualized and non-virtualized resources.

4. The computer processing system according to claim 1 wherein the redefined operating system user interface is further configured to perform the following:
    process an unlock request provided by the user;
    disable said thin client conversion engine in response to the unlock request;
    return control of user interactions with the operating system to the user; and
    make available to the user the at least one intercepted shell component based on the saved state information.

5. The computer processing system according to claim 4 wherein the redefined operating system user interface is further configured to perform the following:
    processing a lock request provided by the user; and
    re-enabling said thin client conversion engine in response to the lock request.

6. The computer processing system according to claim 5 wherein re-enabling said thin client conversion engine causes said thin client conversion engine to perform the following:
    repeat setting the at least one hook to manage control of user interactions with the operating system;
    repeat intercepting the at least one shell component of the operating system so that the at least one shell component is not available to the user;
    repeat saving the state information on the at least one shell component at the time of repeating the intercept; and
    repeat redefining the operating system user interface based on the setting and intercepting without making any changes to the operating system.

7. The computer processing system according to claim 1 wherein the user session is opened when the user logs into the computer processing system.

8. The computer processing system according to claim 1 further comprising at least one input device coupled to said at least one processor, and wherein the at least one hook is configured to take control of said at least one input device so as to prevent any non-allowed user interactions.

9. The computer processing system according to claim 1 wherein the operating system has at least one application program interface (API) associated therewith, and wherein the intercepting comprises using the at least one API to hide or disable the at least one shell component of the operating system.

10. The computer processing system according to claim 9 wherein the at least one shell component comprises at least one of a start menu, a taskbar, and a start button.

11. The computer processing system according to claim 1 wherein said thin client conversion engine is further configured to perform the following:
monitoring activity of said at least one processor so as to detect an idle state of the computer processing system over a set period of time; and
turning off the computer processing system based on the detected idle state.

12. A method for providing thin client conversion of a computer processing system comprising:
detecting when a user session is opened on the computer processing system, with the computer processing system comprising an operating system providing an operating system user interface; and
launching a thin client conversion engine in response to the opened user session and before the user can interact with the operating system, with the thin client conversion engine configured to perform the following
setting at least one hook to manage control of user interactions with the operating system,
intercepting at least one shell component of the operating system so that the at least one shell component is not available to the user,
saving state information on the at least one shell component at the time of intercept, and
redefining the operating system user interface based on the setting and intercepting without making any changes to the operating system so that the user is not able to access the at least one shell component in order to provide a seamless thin client conversion.

13. The method according to claim 12 wherein the redefined operating system user interface initiates connection with a virtualized computing environment.

14. The method according to claim 12 wherein the redefined operating system user interface initiates connection with a restricted user interface to allow access to virtualized and non-virtualized resources.

15. The method according to claim 12 further comprising using the redefined operating system user interface to perform the following:
processing an unlock request provided by the user;
disabling the thin client conversion engine in response to the unlock request;
returning control of user interactions with the operating system to the user; and
making available to the user the at least one intercepted shell component based on the saved state information.

16. The method according to claim 15 further comprising using the redefined operating system user interface to perform the following:
processing a lock request provided by the user; and
re-enabling the thin client conversion engine in response to the lock request.

17. The method according to claim 16 wherein re-enabling the thin client conversion engine comprises:
repeat setting the at least one hook to manage control of user interactions with the operating system;
repeat intercepting the at least one shell component of the operating system so that the at least one shell component is not available to the user;
repeat saving the state information on the at least one shell component at the time of repeating the intercept; and
repeat redefining the operating system user interface based on the setting and intercepting without making any changes to the operating system.

18. The method according to claim 12 wherein the user session is opened when the user logs into the computer processing system.

19. The method according to claim 12 wherein the computer processing system comprises at least one input device, and wherein the at least one hook is configured to take control of the at least one input device so as to prevent any non-allowed user interactions.

20. The method according to claim 12 wherein the operating system has at least one application program interface (API) associated therewith, and wherein the intercepting comprises using the at least one API to hide or disable the at least one shell component of the operating system.

21. The method according to claim 12 wherein the computer processing system comprises at least one processor, and wherein the thin client conversion engine is further configured to perform the following:
monitoring activity of the at least one processor so as to detect an idle state of the computer processing system over a set period of time; and
turning off the computer processing system based on the detected idle state.

22. A non-transitory computer readable medium having a plurality of computer executable instructions for causing a computer processing system to perform steps comprising:
detecting when a user session is opened on the computer processing system, with the computer processing system comprising an operating system providing an operating system user interface; and
launching a thin client conversion engine in response to the opened user session and before the user can interact with the operating system, with the thin client conversion engine configured to perform the following
setting at least one hook to manage control of user interactions with the operating system,
intercepting at least one shell component of the operating system so that the at least one shell component is not available to the user,
saving state information on the at least one shell component at the time of intercept, and
redefining the operating system user interface based on the setting and intercepting without making any changes to the operating system so that the user is not able to access the at least one shell component in order to provide a seamless thin client conversion.

23. The non-transitory computer readable medium according to claim 22 wherein the redefined operating system user interface initiates connection with a virtualized computing environment.

24. The non-transitory computer readable medium according to claim 22 wherein the redefined operating system user interface initiates connection with a restricted user interface to allow access to virtualized and non-virtualized resources.

25. The non-transitory computer readable medium according to claim 22 further causing the computer processing system to perform the following steps via the redefined operating system user interface:
    processing an unlock request provided by the user;
    disabling the thin client conversion engine in response to the unlock request;
    returning control of user interactions with the operating system to the user; and
    making available to the user the at least one intercepted shell component based on the saved state information.

26. The non-transitory computer readable medium according to claim 25 further causing the computer processing system to perform the following steps via the redefined operating system user interface:
    processing a lock request provided by the user; and
    re-enabling the thin client conversion engine in response to the lock request.

27. The non-transitory computer readable medium according to claim 26 wherein re-enabling the thin client conversion engine comprises:
    repeat setting the at least one hook to manage control of user interactions with the operating system;
    repeat intercepting the at least one shell component of the operating system so that the at least one shell component is not available to the user;
    repeat saving the state information on the at least one shell component at the time of repeating the intercept; and
    repeat redefining the operating system user interface based on the setting and intercepting without making any changes to the operating system.

* * * * *